(12) United States Patent
Du et al.

(10) Patent No.: US 11,677,476 B2
(45) Date of Patent: Jun. 13, 2023

(54) RADIO APPARATUS AND SYSTEM

(71) Applicant: NOKIA SOLUTIONS AND NETWORKS OY, Espoo (FI)

(72) Inventors: Jinfeng Du, West Windsor, NJ (US); Qi Zhou, Matawan, NJ (US); Di Che, Atlanta, GA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/584,864

(22) Filed: Jan. 26, 2022

(65) Prior Publication Data

US 2022/0239380 A1 Jul. 28, 2022

(30) Foreign Application Priority Data

Jan. 28, 2021 (FI) .................................... 20215092

(51) Int. Cl.
*H04B 10/58* (2013.01)
*H04B 10/2575* (2013.01)

(52) U.S. Cl.
CPC ......... *H04B 10/58* (2013.01); *H04B 10/2575* (2013.01)

(58) Field of Classification Search
None
See application file for complete search history.

(56) References Cited

U.S. PATENT DOCUMENTS

| | | | |
|---|---|---|---|
| 9,509,404 B2* | 11/2016 | Lozhkin | H04B 10/2575 |
| 9,548,878 B2* | 1/2017 | Gupta | H04B 10/25752 |
| 10,020,887 B2* | 7/2018 | Masunaga | H04B 10/25753 |
| 10,581,469 B1 | 3/2020 | O'Shea et al. | |
| 11,271,651 B2* | 3/2022 | Bao | H04B 10/2575 |
| 11,296,735 B1* | 4/2022 | Kutz | H04B 1/0475 |
| 11,563,493 B2* | 1/2023 | Yang | H04B 10/503 |
| 2012/0154038 A1 | 6/2012 | Kim et al. | |
| 2012/0213261 A1 | 8/2012 | Sayana et al. | |
| 2017/0093495 A1* | 3/2017 | Lozhkin | H04B 10/25753 |

(Continued)

FOREIGN PATENT DOCUMENTS

| | | |
|---|---|---|
| WO | 2020083508 A1 | 4/2020 |
| WO | WO 2020/083508 A1 | 4/2020 |
| WO | WO 2020/125964 A1 | 6/2020 |

OTHER PUBLICATIONS

Extended European Search Report dated Jun. 27, 2022, corresponding to European Patent Application No. 22152583.5.

(Continued)

*Primary Examiner* — Jai M Lee
(74) *Attorney, Agent, or Firm* — Squire Patton Boggs (US) LLP

(57) ABSTRACT

A radio apparatus and system may include a means for modulating and/or demodulating an optical signal for respective transmission and/or reception of the optical signal using an optical channel connected to a remote radio unit. There may also be provided a means for performing, based on one or more pre-trained computational models, one or more operations on a digital signal corresponding to the optical signal for mitigating one or more non-linearities introduced by the optical modulating and/or demodulating means and the optical channel. The one or more pre-trained computational models may be pre-trained based on feedback data indicative of said one or more non-linearities.

12 Claims, 12 Drawing Sheets

(56) References Cited

U.S. PATENT DOCUMENTS

| | | |
|---|---|---|
| 2017/0366209 A1 | 12/2017 | Weissman et al. |
| 2021/0083772 A1* | 3/2021 | Bao .................. H04B 10/40 |
| 2021/0266070 A1* | 8/2021 | Yang .................. H04B 10/2575 |
| 2022/0231764 A1* | 7/2022 | Ghannouchi ........ H04B 10/503 |

OTHER PUBLICATIONS

Finnish Office Action dated May 12, 2021 corresponding to Finnish Patent Application No. 20215092.

Finnish Search Report dated May 12, 2021 corresponding to Finnish Patent Application No. 20215092.

Communication of Acceptance—section 29a of Patents Decree dated Oct. 26, 2021 corresponding to Finnish Patent Application No. 20215092.

Zeb et al., "High Capacity Mode Division Multiplexing Based MIMO Enabled All-Optical Analog Millimeter-Wave Over Fiber Fronthaul Architecture for 5G and Beyond," IEEE Access, vol. 7, Jul. 2, 2019, pp. 89522-89533.

Cho et al., "Experimental Demonstrations of Next Generation Cost-Effective Mobile Fronthaul with IFoF technique," Optical Fiber Communications Conference and Exhibition (OFC), Mar. 22-26, 2015, 3 pages.

Liu et al., "Demonstration of Bandwidth-Efficient Mobile Fronthaul Enabling Seamless Aggregation of 36 E-UTRA-Like Wireless Signals in a Single 1.1-GHz Wavelength Channel," Optical Fiber Communications Conference and Exhibition (OFC), Mar. 22-26, 2015, 3 pages.

Paryanti et al., "A Direct Learning Approach for Neural Network based Pre-distortion for Coherent Nonlinear Optical Transmitter," Journal of Lightwave Technology, vol. 38, No. 15, Aug. 1, 2020, pp. 3883-3896.

Hu et al., "Convolutional Neural Network for Behavioral Modeling and Predistortion of Wideband Power Amplifiers," arXiv, IEEE Transactions on Neural Networks and Learning Systems, May 2020, 15 pages.

* cited by examiner

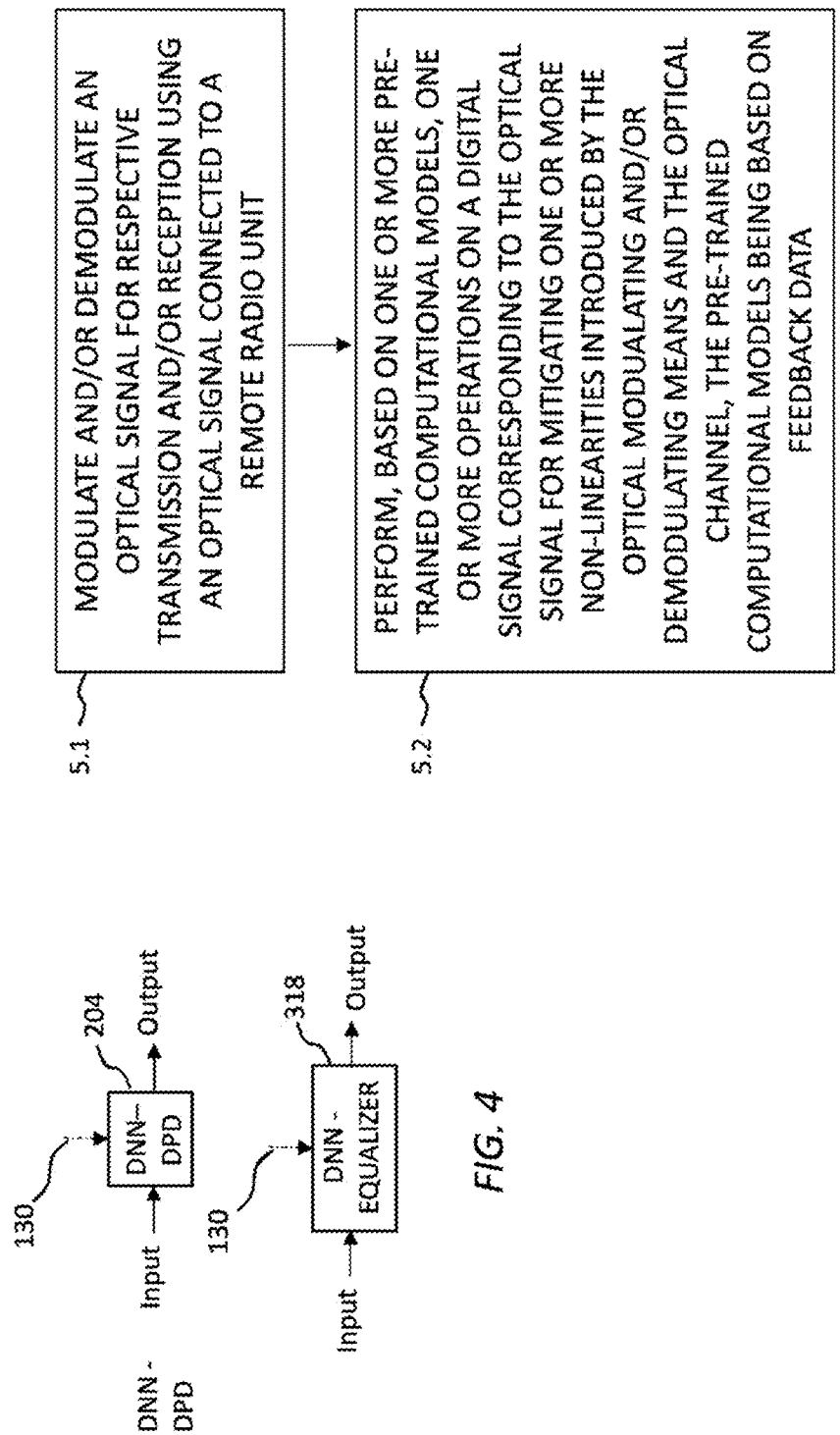

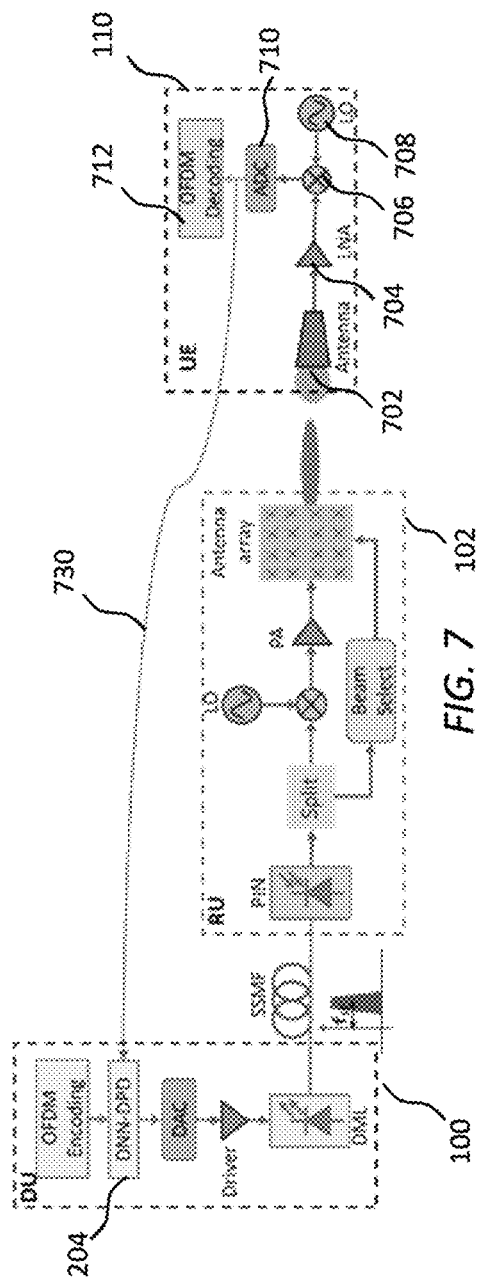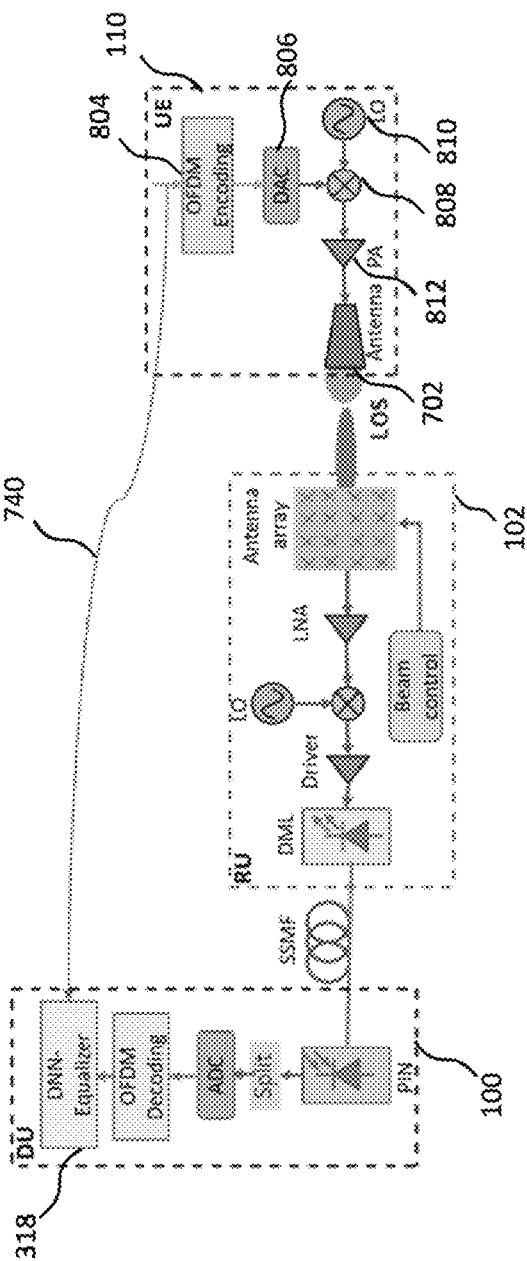
FIG. 7
FIG. 8

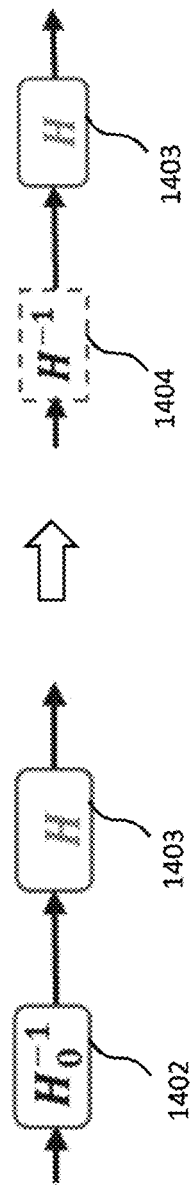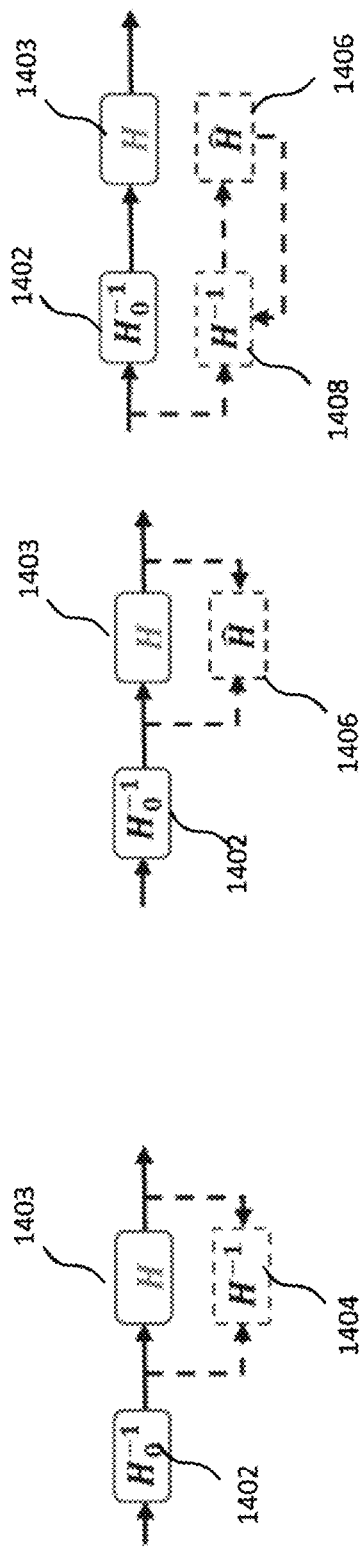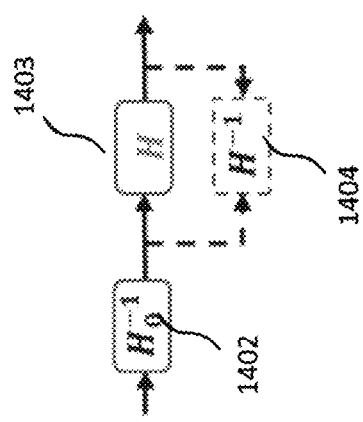

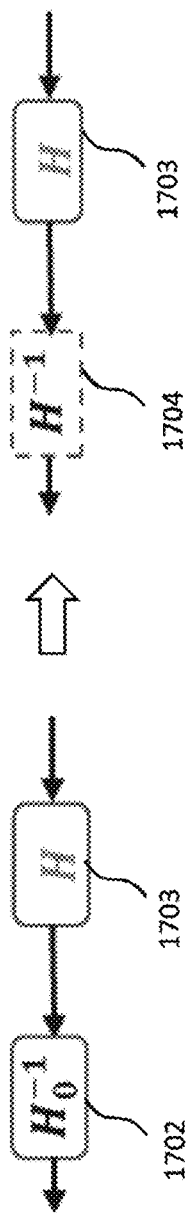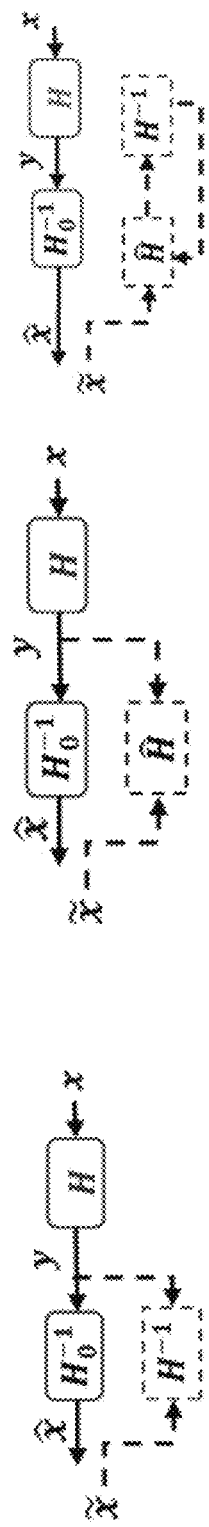

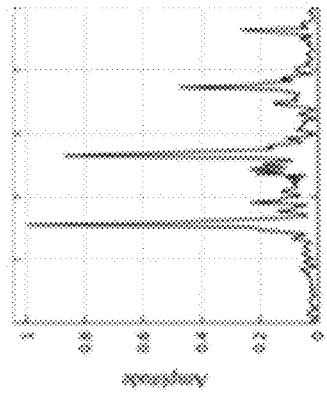
FIG. 20A
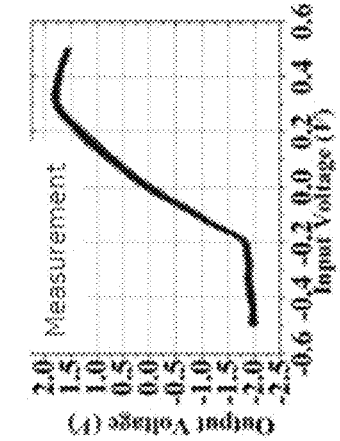
FIG. 20B
FIG. 20C
FIG. 21B
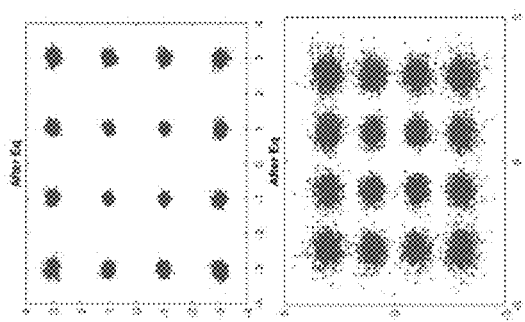
FIG. 21D
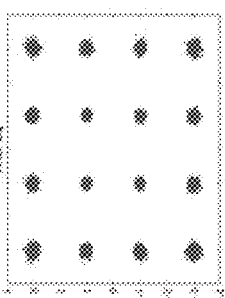
FIG. 21A
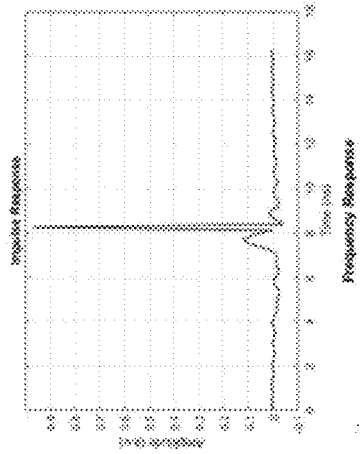
FIG. 21C

RADIO APPARATUS AND SYSTEM

FIELD

Example embodiments relate to a radio apparatus and system, and to methods relating to a radio apparatus and system.

BACKGROUND

In some radio access networks (RANs), it is proposed to provide separate distribute units (DUs), which are sometimes known as baseband controllers, and radio units (RUs). The RUs may comprise at least part of a digital front end (DFE), an analogue front end (AFE) and one or more antennas for transceiving signals wirelessly with, for example, mobile nodes such as mobile handsets. RUs may be installed at cell cites which may be remote from the DUs. A DU may be connected to one or to multiple RUs via respective optical channels, e.g. using optical fibres. The optical channels between a DU and the one or more RUs may be referred to as part of a fronthaul network. An example interface standard for such fronthaul networks is known as the Common Public Radio Interface (CPRI) standard.

The Fifth Generation (5G) New Radio (NR) standard will use millimetre wave frequency bands to meet growing capacity and demand. A result of this is shorter wireless signal coverage of the RUs and hence the need for a denser deployment of such RUs.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: modulating and/or demodulating an optical signal for respective transmission and/or reception of the optical signal using an optical channel connected to a remote radio unit; and performing, based on one or more pre-trained computational models, one or more operations on a digital signal corresponding to the optical signal for mitigating one or more non-linearities introduced by the optical modulating and/or demodulating means and the optical channel, the one or more pre-trained computational models being pre-trained based on feedback data indicative of said one or more non-linearities.

In some example embodiments, the apparatus may comprise means for: providing the digital signal; performing, based on a pre-trained computational model, a predistortion operation on the digital signal to produce a predistorted digital signal; converting the predistorted digital signal to an analogue signal; modulating an optical signal based on the analogue signal; and transmitting, via the optical channel to the radio unit, the optical signal for demodulation by an optical demodulator of the radio unit for transmission via one or more antennas of the radio unit, wherein the computational model is pre-trained based on feedback data indicative of the one or more non-linearities introduced at least by the optical signal modulating means, the optical channel and the optical demodulator of the radio unit.

The pre-trained computational model may be pre-trained based on feedback data from a radio receiver in wireless signal communication with the radio unit, the feedback data being further indicative of one or more non-linearities introduced by one or more amplifiers of the radio unit and of the radio receiver.

The feedback data may comprise digital versions of signals received by the radio receiver corresponding to digital signals provided by the apparatus, wherein the computational model is pre-trained based on the received and provided digitally encoded signals.

The means for performing the predistortion operation may comprise the pre-trained computational model which is configured to receive the provided digital signal as input and to output the predistorted digital signal based on learned coefficients of the pre-trained computational model.

The pre-trained computational model may comprise one or more neural networks.

The digital signal may represent a baseband signal and the modulating means is configured to up-convert the baseband signal to an intermediate frequency (IF).

A plurality of digital signals may be provided for transmission by a plurality of respective radio units connected to the apparatus by respective optical channels.

The means for performing the predistortion operation may comprise: a first version of the computational model for performing a predistortion operation on a first digital signal for transmission by a first radio unit, and a second version of the computational model for performing a predistortion operation on a second digital signal for transmission by a second radio unit, at least one of the first and second versions being a modified version of the pre-trained computational model based on receiving further feedback data.

A plurality of digital signals may be provided, each digital signal representing a respective beam to be transmitted by a respective plurality of antenna elements of a radio unit, the apparatus being configured to: convert the plurality of digital signals to respective analogue signals; modulate and transmit to the radio unit an optical signal over the optical channel based on the respective analogue signals at different intermediate frequencies; and transmit to the radio unit one or more control signals over the optical channel indicative of which of the one or more analogue signals to transmit using a particular beam at a particular time.

The means for providing the digital signal may be an orthogonal frequency-division multiplexing (OFDM) encoder or variant thereof.

The apparatus may comprise means for: receiving an optical signal received from a radio unit over the optical channel; demodulating the optical signal to provide an analogue signal; converting the analogue signal to a digital signal; and performing, based on the pre-trained computational model, an equalization operation on the digital signal or a digitally decoded version thereof to produce an equalized digital signal, wherein the computational model is pre-trained based on feedback data indicative of one or more non-linearities introduced at least by an optical signal modulating means of the radio unit, the optical channel and the optical demodulator of the apparatus.

The apparatus may comprise means for performing an OFDM decoding operation to provide an OFDM decoded version of the digital signal and wherein the equalization operation is performed on the OFDM decoded version of the digital signal.

The computational model may be pre-trained based on feedback data from a radio transmitter in wireless signal communication with the radio unit, the feedback data being further indicative of non-linearities introduced by one or more amplifiers of the radio unit and of the radio transmitter.

In some example embodiments, the feedback data may comprise digital signals transmitted by the radio transmitter corresponding to digital signals received and converted by the apparatus, wherein the computational model is pre-trained based on the transmitted and received digital signals.

The apparatus may be configured to receive a plurality of optical signals, representing respective digital signals from a plurality of respective radio units connected to the apparatus by respective optical channels.

The means for performing the equalization operation may comprise: a first version of the computational model for performing an equalization operation on a first digital signal from a first radio unit; and a second version of the computational model for performing an equalization operation on a second digital signal received from a second radio unit, at least one of the first and second versions being a modified version of the pre-trained computational model based on receiving further data.

The apparatus may be configured to receive an optical signal representing a plurality of beams from respective plurality of antenna elements of a radio unit; filter the analogue signal corresponding to the demodulated optical signal to recover a plurality of analogue signals corresponding to the plurality of beams; convert the plurality of analogue signals into respective digital signals; and perform the linearizing operation on the respective digital signals.

The linearizing operation is performed on respective OFDM decoded digital signals.

According to a second aspect, there may be provided a system, comprising: an apparatus, being a distribute unit apparatus of a radio access network, according to any preceding definition; and one or more radio units connected to the distribute unit apparatus by one or more respective optical channels.

Each of the one or more radio units may comprise an optical demodulator for demodulating a received optical signal from the distribute unit apparatus and one or more antennas for wireless transmission of the demodulated signal to one or more radio receivers.

The one or more radio units may further comprise means for filtering the received signals from the optical demodulator to recover the respective analogue signals and the one or more control signals and for transmitting the one or more analogue signals using a particular antenna beam at a particular time based on the one or more control signals.

The filtering means of the one or more radio units may comprise one or more analogue filters.

Each of the one or more radio units may comprise an optical modulator for modulating an optical signal for transmission to the distribute unit apparatus and one or more antennas for wireless reception of one or more signals from one or more radio transmitters.

According to a third aspect, there may be provided a method, comprising: modulating and/or demodulating an optical signal for respective transmission and/or reception of the optical signal using an optical channel connected to a remote radio unit; and performing, based on one or more pre-trained computational models, one or more operations on a digital signal corresponding to the optical signal for mitigating one or more non-linearities introduced by the optical modulating and/or demodulating and the optical channel, the one or more pre-trained computational models being pre-trained based on feedback data indicative of said one or more non-linearities.

In some example embodiments, the method may comprise: providing the digital signal; performing, based on a pre-trained computational model, a predistortion operation on the digital signal to produce a predistorted digital signal; converting the predistorted digital signal to an analogue signal; modulating an optical signal based on the analogue signal; and transmitting, via the optical channel to the radio unit, the optical signal for demodulation by an optical demodulator of the radio unit for transmission via one or more antennas of the radio unit, wherein the computational model is pre-trained based on feedback data indicative of the one or more non-linearities introduced at least by the optical signal modulating, the optical channel and the optical demodulating of the radio unit.

The pre-trained computational model may be pre-trained based on feedback data from a radio receiver in wireless signal communication with the radio unit, the feedback data being further indicative of one or more non-linearities introduced by one or more amplifiers of the radio unit and of the radio receiver.

The feedback data may comprise digital versions of signals received by the radio receiver corresponding to provided digital signals, wherein the computational model is pre-trained based on the received and provided digitally encoded signals.

Performing the predistortion operation may comprise using the pre-trained computational model which is configured to receive the provided digital signal as input and to output the predistorted digital signal based on learned coefficients of the pre-trained computational model.

The pre-trained computational model may comprise one or more neural networks.

The digital signal may represent a baseband signal and the modulating may comprise up-converting the baseband signal to an intermediate frequency (IF).

A plurality of digital signals may be provided for transmission by a plurality of respective radio units connected by respective optical channels.

The predistortion operation may comprise: using a first version of the computational model for performing a predistortion operation on a first digital signal for transmission by a first radio unit, and using a second version of the computational model for performing a predistortion operation on a second digital signal for transmission by a second radio unit, at least one of the first and second versions being a modified version of the pre-trained computational model based on receiving further feedback data.

A plurality of digital signals may be provided, each digital signal representing a respective beam to be transmitted by a respective plurality of antenna elements of a radio unit, the method comprising: converting the plurality of digital signals to respective analogue signals; modulating and transmitting to the radio unit an optical signal over the optical channel based on the respective analogue signals at different intermediate frequencies; and transmitting to the radio unit one or more control signals over the optical channel indicative of which of the one or more analogue signals to transmit using a particular beam at a particular time.

The digital signal may be provided by an orthogonal frequency-division multiplexing (OFDM) encoder or variant thereof.

The method may comprise: receiving an optical signal received from a radio unit over the optical channel; demodulating the optical signal to provide an analogue signal; converting the analogue signal to a digital signal; and performing, based on the pre-trained computational model, an equalization operation on the digital signal or a digitally decoded version thereof to produce an equalized digital signal, wherein the computational model is pre-trained based on feedback data indicative of one or more non-linearities introduced at least by an optical signal modulating means of the radio unit, the optical channel and an optical demodulator.

The method may comprise performing an OFDM decoding operation to provide an OFDM decoded version of the digital signal and wherein the equalization operation is performed on the OFDM decoded version of the digital signal.

The computational model may be pre-trained based on feedback data from a radio transmitter in wireless signal communication with the radio unit, the feedback data being further indicative of non-linearities introduced by one or more amplifiers of the radio unit and of the radio transmitter.

In some example embodiments, the feedback data may comprise digital signals transmitted by the radio transmitter corresponding to received and converted digital signals, wherein the computational model is pre-trained based on the transmitted and received digital signals.

The method may comprise receiving a plurality of optical signals, representing respective digital signals received from a plurality of respective radio units by respective optical channels.

Performing the equalization operation may comprise: using a first version of the computational model for performing an equalization operation on a first digital signal from a first radio unit; and using a second version of the computational model for performing an equalization operation on a second digital signal received from a second radio unit, at least one of the first and second versions being a modified version of the pre-trained computational model based on receiving further data.

The method may comprise receiving an optical signal representing a plurality of beams from respective plurality of antenna elements of a radio unit; filtering the analogue signal corresponding to the demodulated optical signal to recover a plurality of analogue signals corresponding to the plurality of beams; converting the plurality of analogue signals into respective digital signals; and performing the linearizing operation on the respective digital signals.

The linearizing operation may be performed on respective OFDM decoded digital signals.

According to a third aspect, there is provided a method, the method comprising: training a computational model for performance of one or more operations on digital signals at a distribute apparatus, the training being based on feedback data from a radio receiver in wireless signal communication with a radio unit connected to the distribute apparatus by an optical channel, the feedback data being indicative of one or more non-linearities introduced by an optical modulating and/or demodulating means of the distribute apparatus, an optical modulating and/or demodulating means of the radio unit and the optical channel, one or more amplifiers of the radio unit or of the radio receiver.

The training may comprise training one or more neural networks.

The training may comprise a pre-training operation to provide a pre-trained computational model for performing one or more predistortion and/or equalization operations on digital signals.

The training may comprise a refinement training operation on the provided pre-trained computational model to provide a modified computational model for performing one or more predistortion and/or equalization operations on digital signals.

According to a fourth aspect, there may be provided a work product comprising a computational model created by means of the method of the third aspect.

According to a fifth aspect, there is provided a computer program product comprising a set of instructions which, when executed on an apparatus, is configured to cause the apparatus to carry out the method of: modulating and/or demodulating an optical signal for respective transmission and/or reception of the optical signal using an optical channel connected to a remote radio unit; and performing, based on one or more pre-trained computational models, one or more operations on a digital signal corresponding to the optical signal for mitigating one or more non-linearities introduced by the optical modulating and/or demodulating and the optical channel, the one or more pre-trained computational models being pre-trained based on feedback data indicative of said one or more non-linearities.

The computer program product may cause the apparatus to carry out any operation related to the fourth or fifth aspects.

According to a sixth aspect, there is provided a non-transitory computer readable medium comprising program instructions stored thereon for performing a method, comprising: modulating and/or demodulating an optical signal for respective transmission and/or reception of the optical signal using an optical channel connected to a remote radio unit; and performing, based on one or more pre-trained computational models, one or more operations on a digital signal corresponding to the optical signal for mitigating one or more non-linearities introduced by the optical modulating and/or demodulating and the optical channel, the one or more pre-trained computational models being pre-trained based on feedback data indicative of said one or more non-linearities.

The program instructions may perform any operation related to the fourth or fifth aspects.

According to a seventh aspect, there is provided an apparatus comprising: at least one processor; and at least one memory including computer program code which, when executed by the at least one processor, causes the apparatus: to modulate and/or demodulate an optical signal for respective transmission and/or reception of the optical signal using an optical channel connected to a remote radio unit; and to perform, based on one or more pre-trained computational models, one or more operations on a digital signal corresponding to the optical signal for mitigating one or more non-linearities introduced by the optical modulating and/or demodulating and the optical channel, the one or more pre-trained computational models being pre-trained based on feedback data indicative of said one or more non-linearities.

The program instructions may perform any operation related to the fourth or fifth aspects.

BRIEF DESCRIPTION OF DRAWINGS

Example embodiments will now be described by way of non-limiting example, with reference to the accompanying drawings, in which:

FIG. 4 is a schematic view of a computational model as may be used in embodiments described herein;

FIG. 5 is a flow diagram indicating processing operations that may be performed by an apparatus according some embodiments;

FIG. 7 is a schematic view of a first pre-training setup for the FIG. 1 architecture;

FIG. 8 is a schematic view of a second pre-training setup for the FIG. 1 architecture;

FIGS. 14A-14B are schematic diagrams, including transfer functions, indicative of how refinement-training of a computational model may be performed according to some example embodiments;

FIG. 15 is a schematic diagram indicating one refinement-training process;

FIGS. 16A-16B are schematic diagrams indicating another refinement-training process;

FIGS. 17A-17B are schematic diagrams indicating another refinement-training process;

FIG. 18 is a schematic diagram indicating another refinement-training process;

FIGS. 19A-19B are schematic diagrams indicating another refinement-training process;

FIGS. 20A-20C are graphs indicative of effects, including non-linearities, useful for understanding operation of some example embodiments;

FIGS. 21A-21D are graphical representations of simulated performance due to the FIG. 20A-20C effects;

DETAILED DESCRIPTION

Example embodiments may relate to a radio apparatus and system, and method relating to a radio apparatus and system.

In some radio access network (RAN) architectures, it is known to provide separate distribute units (DUs), which are sometimes known as baseband controllers, and radio units (RUs) which comprise at least part of a digital front end (DFE), an analogue front end (AFE) and one or more antennas for transceiving signals wirelessly with, for example, mobile nodes such as user equipment (UE). RUs may be installed at cell cites which may be remote from the DUs, for example at cell sites which may be a matter of kilometres away. A DU may be connected to one or multiple RUs via respective optical channels, e.g. using optical fibres. The optical channels between a DU and the one or more RUs may be referred to as part of a fronthaul network. An example interface standard for such fronthaul networks is known as the Common Public Radio Interface (CPRI) standard.

The Fifth Generation (5G) New Radio (NR) standard will use millimetre wave frequency bands to meet growing capacity and demand. A result of this is shorter wireless signal coverage of the RUs and hence the need for a denser deployment of such RUs. As a consequence, it is desirable to provide RUs which are, for example, smaller, lighter, cheaper and which may consume less power. The RUs also need to provide the required functionality at appropriate performance levels.

For the avoidance of doubt, example embodiments are not limited to 5G NR RANs or associated standards. They may be applicable to other existing or future networks.

Providing RUs which are technically less complex is one way of addressing issues associated with densification.

Example embodiments may provide apparatuses, systems and methods wherein signals may be transmitted from a DU to one or more RUs over a respective optical channel, e.g. via one or more optical fibres. This may enable all or a substantial part of the digital signal processing to be performed at the DU rather than at the one or more RUs. This concept may be referred to as analogue radio-over-fibre. For example, analogue radio-over-fibre may be sub-categorized as radio frequency (RF)-over-fibre, intermediate frequency (IF)-over-fibre and baseband-over-fibre.

Example embodiments may focus on an IF-over-fibre implementation but are not necessarily limited to such.

Although analogue-radio-over-fibre techniques may reduce complexity at the RU, considerations as to the distortions that the resulting architectures may introduce need to be taken into account.

Figure 1:
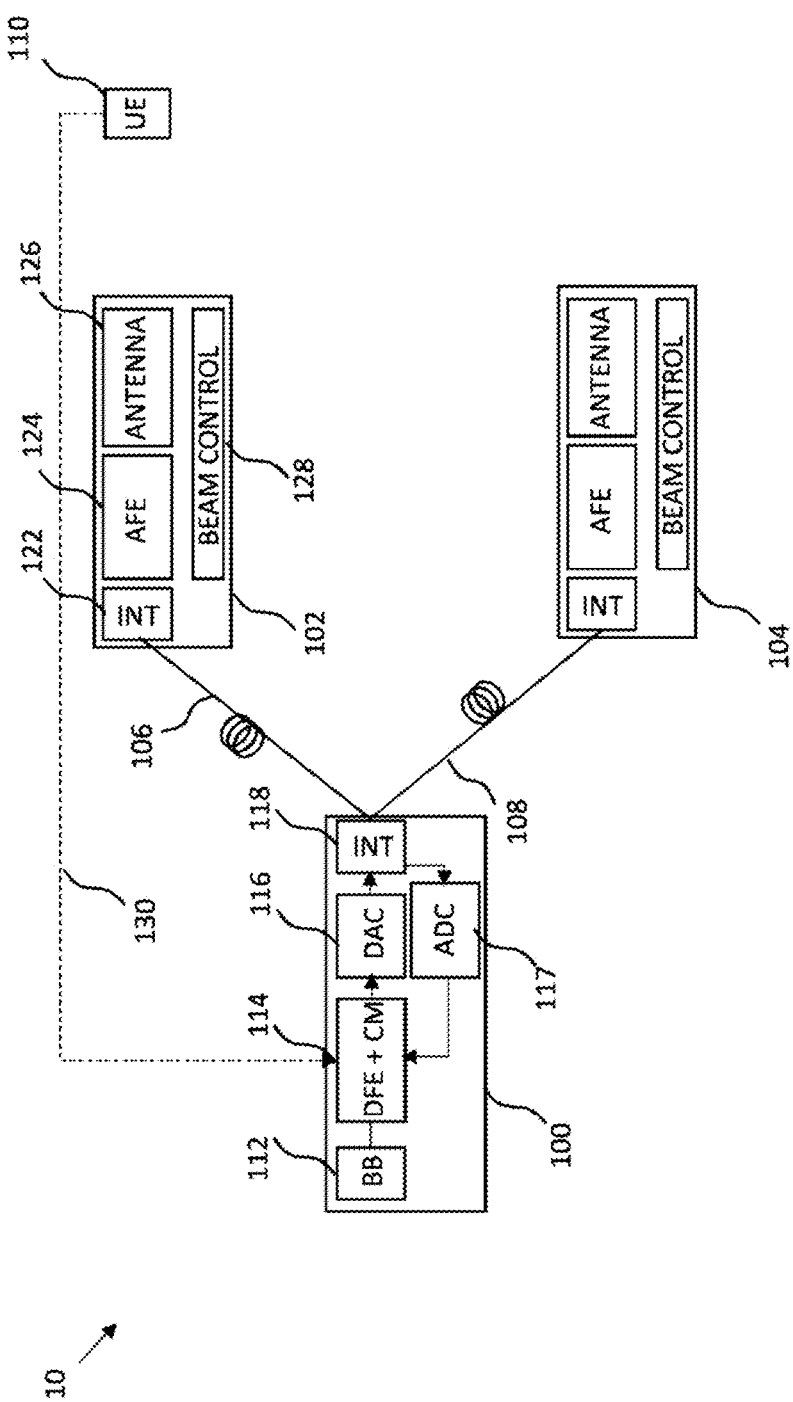
FIG. 1 is a schematic view of an example system according to some example embodiments.

FIG. 1 is a schematic view of an example system 10 according to some example embodiments.

In the system 10, a DU 100 is shown connected to first and second RUs 102, 104 by respective optical channels 106, 108 which may comprise one or more optical fibres. In other embodiments, there may be only one RU, e.g. the first RU 102, or more than two RUs connected to the DU boo by one or more respective optical channels.

The DU 100 may comprise functional blocks, one or more of which may be implemented in hardware, software, firmware or a combination thereof. The DU 100 may operate in an downlink mode for providing signals to the RUs 102, 104 and in a uplink mode for receiving signals from the RUs. Each mode will generally be considered separately in the description below but it may be assumed that the DU 100 and the first and second RUs 102, 104 may operate in both modes.

It will be seen that the DU 100 provides common functionality for the first and second RUs 102, 104. The following description may relate to one RU, namely the first RU 102, but it will be appreciated that the same functionality may be provided for the second RU 104 and sometimes using common hardware, software, firmware of combination thereof.

For example, the DU 100 may comprise a baseband module 112, a digital front end (DFE) 114, which may comprise one or more computational models, a digital-to-analogue converter (DAC) 116, an analogue-to-digital converter (ADC) 117 and an optical interface 118.

The DAC 116 may operate when the DU 100 operates in the downlink mode whereas the ADC 117 may operate when the DU operates in the uplink mode.

The baseband module 112 may represent baseband digital data for transmission in the downlink mode or baseband digital data received from a RU 102, 104 in the uplink mode. The baseband module 112 may comprise processing functionality for encoding and decoding baseband digital data, to and from a particular encoding format, e.g. using Orthogonal Frequency Division Multiplexing (OFDM) or a variant thereof, such as SC-OFDM or pulse-shaping OFDM.

The baseband digital data, whether before or after OFDM encoding or decoding, may be referred to herein as provided/received digital signal(s).

The DFE 114 may comprise one or more digital processing modules, for example one or more Field Programmable Gate Arrays (FPGAs), Application Specific Integrated Circuits (ASICs) or any one or more processors or controllers configured to perform digital signal processing (DSP) operations on the digital signals.

An example DFE operation may comprise predistortion on digital signals for transmission in the downlink mode. Another example DFE operation may comprise equalization on digital signals received in the uplink mode.

Such DFE operations will be described in greater detail later on.

A user equipment (UE) no is shown in wireless communication range of, in the shown example, the first RU 102. As indicated by the dashed line 130, feedback data from the UE no may be used for pre-training of the above-mentioned one or more computational models which may form the basis of, for example, the abovementioned predistortion and/or equalization operations.

The DAC 116 may operate in the downlink mode and may receive, as input, predistorted digital signals from the DFE 114 and may convert this data to a corresponding analogue signals.

The ADC 117 may operate in the uplink mode and may receive, as input, received analogue signals from the optical interface 118.

The optical interface 118 may be configured, in the downlink mode, to modulate an optical signal based on the received analogue signals from the DAC 116. This modulation may also involve up-converting the analogue signal to an intermediate frequency (IF). The IF may be particular to the relevant RU 102, 104, i.e. a first IF may be used for the first RU and a second IF may be used for the second RU, the first and second IFs being different. Modulation may involve use of, for example, a directly modulated laser (DML). The optical signal may be transmitted to the required RU, e.g. the first RU 102, by means of the first optical channel 106.

In the uplink mode, the optical interface 118 may be configured to demodulate a received optical signal from, for example, the first RU 102, and, where the received optical signal is at an IF, the optical interface 118 may down-convert the optical signal to baseband for input to the ADC 117.

The first RU 102 may comprise an optical interface 122 similar to that of the DU 100 for inverse operation in the downlink and uplink modes. The optical modulation scheme between the optical interfaces 118, 122 may use what is termed intensity modulation/direct detection (IMDD). This means that relatively simple and inexpensive components may comprise the optical interfaces 118, 122.

The first RU 102 may also comprise an analogue front end (AFE) 124, an antenna 126 and a beam control module 128, the functions of which will be described later on. The antenna 126 may comprise a beamforming antenna comprising a plurality, e.g. a grid, of antenna elements.

The second RU 104 may be configured in substantially the same way as the first RU 102.

In overview, therefore, it will be seen that the first and second RUs 102, 104 may comprise no DFE and/or no DAC or ADC functionality, making them less complex and therefore better suited to dense deployment scenarios. Further, the use of IMDD type optical interfaces 118, 122 may keep complexity low.

Figure 2:
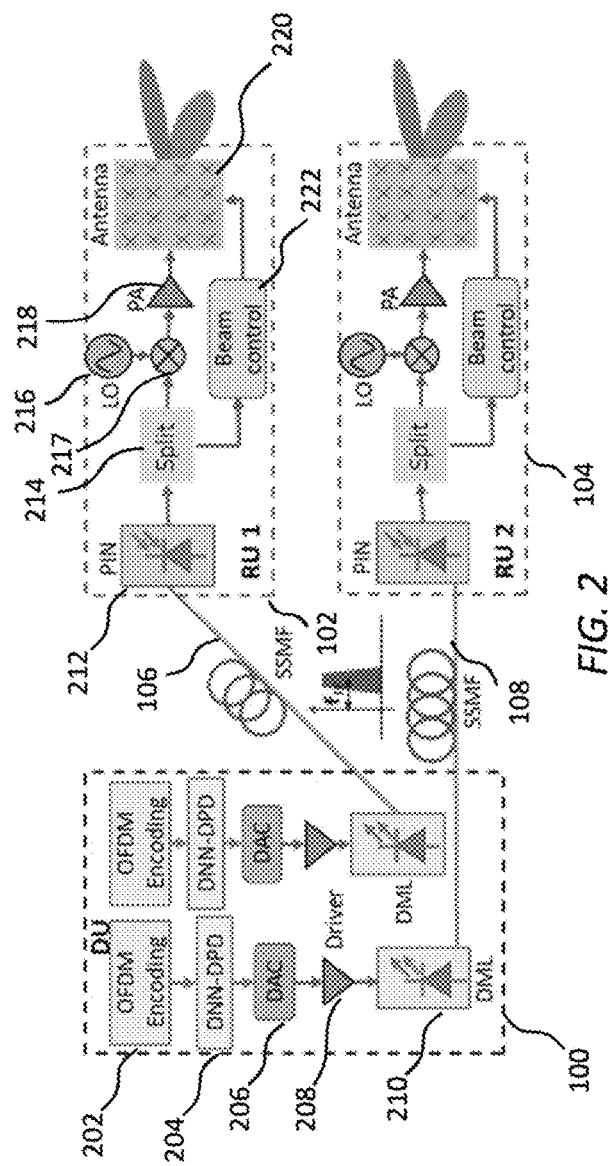
FIG. 2 is a schematic view of the FIG. 1 architecture when used in a downlink mode.
Figure 3:
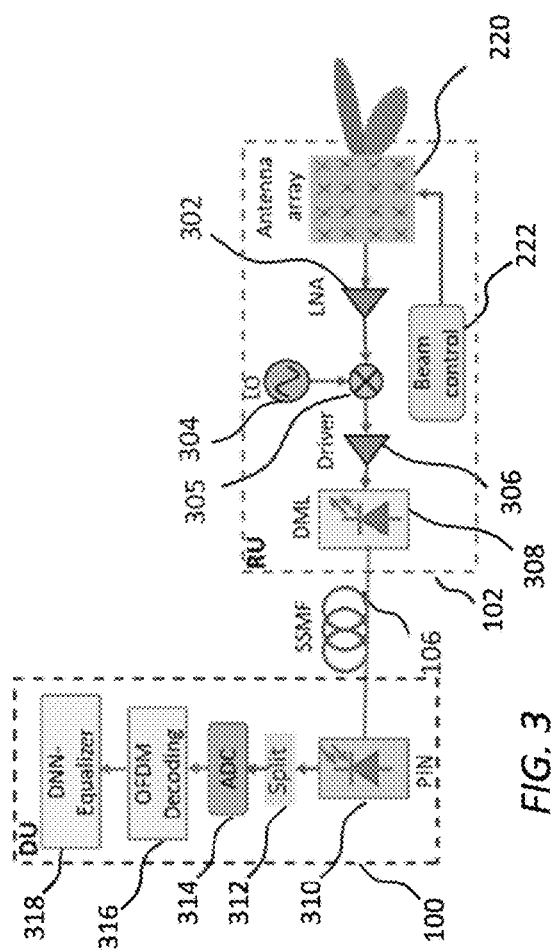
FIG. 3 is a schematic view of the FIG. 1 architecture when used in the uplink mode.

FIGS. 2 and 3 are schematic views of the FIG. 1 architecture when used in respective downlink and uplink modes.

Referring to FIG. 2, in the downlink mode, two instantiations of common components or modules are shown, indicative of a first instantiation corresponding to the first RU 102 and a second instantiation corresponding to the second RU 104. For ease of explanation, the following will refer to the first instantiation indicated by reference numerals 202, 204, 206, 208 and 210.

The DU 100 may comprise an OFDM encoding module 202, a deep neural network-digital predistortion (DNN-DPD) module 204, a DAC 206, a driver 208 and a DML 210.

The first RU 102 may comprise a PIN diode 212, a splitter module 214, a mixer 217, a local oscillator (LO) 216, a power amplifier 218, an antenna 220 and a beam controller 222.

The second RU 104 may comprise substantially the same components and functionality as the first RU 102.

The OFDM encoding module 202 may correspond to the baseband module 112 shown in FIG. 1. The OFDM encoding module 202 may encode received baseband digital signals into OFDM encoded digital signals or a variant thereof. The OFDM encoding module 202 may provide the OFDM encoded digital signals to the DNN-DPD module 204. The term digital signals may be used in both cases as it will be clear in context whether the digital signals are baseband or OFDM encoded digital signals.

The DNN-DPD module 204 may comprise a part of the DFE 114 shown in FIG. 1. The DNN-DPD module 204 may comprise a computational model for performing predistortion operation on the received digital signals to produce predistorted digital signals as output.

In this respect, when operating in the downlink mode, the DNN-DPD module 204 may provide digital predistortion (DPD) whereby non-linearities introduced by one or more non-linear components of the shown signal-processing chain may be corrected or compensated for. This is by predistorting the digitally signals, effectively as the inverse of an estimated end-to-end non-linear channel. The DNN-DPD module 204 may be pre-trained and later refined in separate training operations as will be explained later on.

The DNN computational model 204 may comprise any machine learning model such as may be provided by one or more neural networks having any appropriate training scheme and structure. The term DNN need not imply any particular structure.

In example embodiments, digital signals input to the DNN-DPD module 204 may directly produce as output the predistorted digital signals, as indicated in FIG. 4. In other embodiments, the DNN-DPD module 204 may generate reference data, such as a look up table, that indicates output signals corresponding to given input signals.

The DNN-DPD module 204 may be pre-trained and later refined in separate training operations as will be explained later on. Pre-training may be performed in advance of deployment of a particular DU-RU pairing, e.g. at a factory or in a laboratory, and therefore may take into account non-linearities measured in advance of deployment such that, when deployed, some form of DPD is already catered for. Refinement of the DNN-DPD module 204 may be performed "on-site" after deployment. The DNN computational model 204 may be particular to the particular DU-RU pair, e.g. the DU 100 and the first RU 102 taking into account its particular characteristics.

Returning to FIG. 2, the predistorted digital signals are passed to the DAC 206, which may be equivalent to the DAC 116 shown in FIG. 1, for producing an analogue signal. The analogue signal is then passed to the driver 208 and then to the DML 210 which may modulate an optical signal based on the analogue signal. As mentioned above, the DML 210 may be configured to modulate the optical signal using direct modulation and may also involve up-conversion to a particular IF.

The modulated optical signal may be sent over, in this example, the first optical channel 106 to the first RU 102.

At the first RU 102, a PIN diode 212, being part of the optical interface equivalent to that mentioned in respect of FIG. 1, may demodulate the optical signal into an analogue signal for subsequent analogue processing via components equivalent to the AFE 124 shown in FIG. 1. For example, a LO 216 may up-convert via a mixer 217 the analogue signal to a radio frequency (RF) signal, whereafter the power amplifier 218 may amplify the RF signal for transmission via the antenna 220.

In some example embodiments, the digital signals may correspond to a particular beam to be transmitted using one or more antenna elements of the antenna 220 at the first RU 102. The digital signals may have one or more associated control signals which is or are indicative of a beam index which the beam controller 222 of the first RU 102 may decode for sending beam control signalling to the antenna 220. The one or more associated control signals may further indicate a schedule, indicative of a time or relative time when to transmit the beam. The one or more control signals may have a low data rate (relative to the digital signals). The one or more control signals may be transmitted at a different frequency (e.g. different IF) than the analogue signals, possibly separated by a guard band. The splitter module 214 may be configured as a filter, e.g. comprising one or more analogue frequency-selective filters, to recover the analogue signals separate from their associated control signalling. As indicated in FIG. 2, the analogue signals may be passed to the mixer 217 whereas the one or more control signals may be passed to the beam controller 222.

In some embodiments, a plurality of digital signals may be provided by the OFDM encoding module 202, as well as one or more associated control signals, and the digital signals may be combined by, for example, an analogue coupler at different respective IFs and the splitter module 214 used as above to recover the different corresponding analogue signal streams as well as the control data which may indicate which beam to transmit at which time. As before, the one or more control signals may be decoded by the beam controller 222 for controlling the antenna 220.

Referring to FIG. 3, in the uplink mode, the first RU 102 may comprise the antenna 220 and beam controller 222 as described above.

The first RU 102 may further comprise a low noise amplifier (LNA) 302, a mixer 305 associated with a LO 304, a driver 306 and a DML 308.

The DU 100 may comprise a PIN diode 310, being part of the optical interface equivalent to that mentioned in respect of FIG. 1. The DU 100 may also comprise a splitter module 312, an ADC 314, an OFDM decoding module 316 and a DNN-equalizer module 318.

In the uplink mode, the beam controller 222 may be configured to select via control signalling a particular beam for receiving an RF signal via the antenna 220 according to a schedule. The received RF signal may then pass via the LNA 302 to the mixer 305 where it may be down-converted to an IF, possibly combined with other signals, and then passes via the driver 306 to the DML 308 which modulates the one or more IF signals to an optical wavelength for transmission over the first optical channel 106 to the DU 100.

At the DU 100, the received optical signal(s) may be demodulated by the PIN diode 310, and the splitter module 312, if needed, may filter the one or more analogue signals which may then be converted into respective digital signals by the ADC 314. The digital signals may then be passed to the OFDM decoding module 316 for decoding in a known manner. The OFDM-decoded digital signals may then pass to the DNN-Equalizer module 318 which is configured to perform equalization (or linearization) based on another computational model which may directly generate as output an equalized or linearized version of the OFDM-decoded digital signal in the manner shown also in FIG. 4.

In another example embodiment, the order of the OFDM decoding module 316 and the DNN-Equalizer module 318 may be reversed.

This, two computational models, namely the DNN-DPD module 204 and DNN-Equalizer module 318 may be provided in a given DU 100. Each may be pre-trained and subsequently refined, if needed.

FIG. 5 is a flow diagram indicating processing operations that may be performed by the DU 100. The processing operations may be performed using hardware, firmware, software or a combination thereof.

A first operation 5.1 may comprise modulating and/or demodulating an optical signal for respective transmission and/or reception of the optical signal using an optical channel connected to a remote radio unit.

A second operation 5.2 may comprise performing, based on one or more pre-trained computational models, one or more operations on a digital signal corresponding to the optical signal for mitigating one or more non-linearities introduced by the optical modulating and/or demodulating means and the optical channel, the one or more pre-trained computational models being pre-trained based on feedback data indicative of said one or more non-linearities.

Figures 6A, 6B:
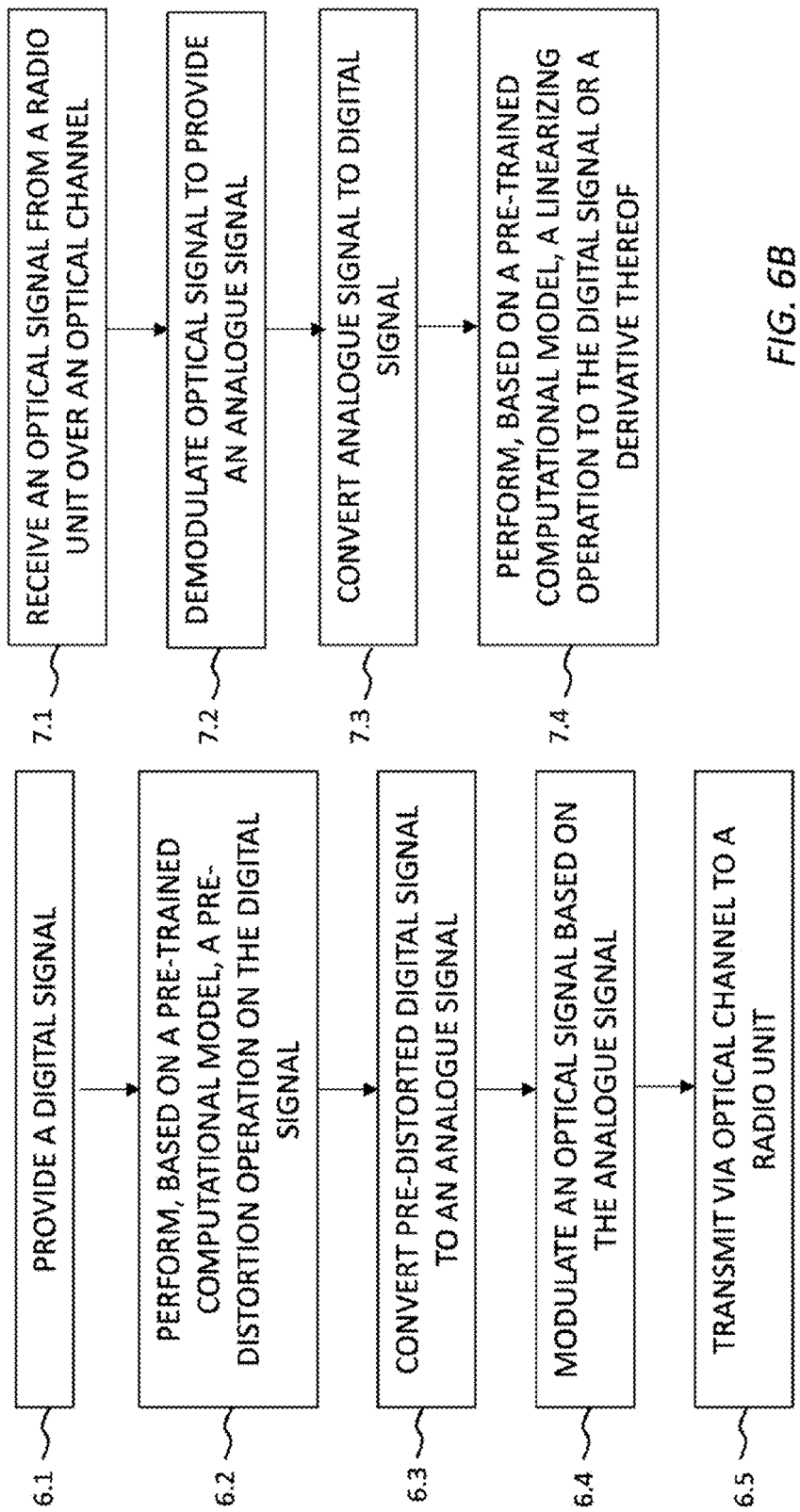
FIG. 6A is a flow diagram indicating processing operations that may be performed by an apparatus according some embodiments in one mode.
FIG. 6B is a flow diagram indicating processing operations that may be performed by an apparatus according some embodiments in another mode.

For completeness, FIGS. 6A and 6B are flow diagrams respectively indicating processing operations performed by the DU 100 for downlink and uplink modes of operation. The processing operations may be performed using hardware, firmware, software or a combination thereof.

Referring to FIG. 6A, relating to the downlink mode, a first operation 6.1 may comprise providing a digital signal.

A second operation 6.2 may comprise performing, based on a pre-trained computational model, a predistortion operation on the digital signal to produce a predistorted digital signal.

A third operation 6.3 may comprise converting the predistorted digital signal to an analogue signal.

A fourth operation 6.4 may comprise modulating an optical signal based on the analogue signal.

A fifth operation 6.5 may comprise transmitting, via the optical channel to the radio unit, the optical signal for demodulation by an optical demodulator of the radio unit for transmission via one or more antennas of the radio unit.

Referring to FIG. 6B, relating to the uplink mode, a first operation 7.1 may comprise receiving an optical signal received from a radio unit over the optical channel.

A second operation 7.2 may comprise demodulating the optical signal to provide an analogue signal.

A third operation 7.3 may comprise converting the analogue signal to a digital signal.

A fourth operation 7.4 may comprise performing, based on the pre-trained computational model, an equalization operation on the digital signal or a digitally decoded version thereof to produce an equalized digital signal.

Pre-Training of Computational Models

FIGS. 7 and 8 show schematic views of pre-training setups, corresponding to FIGS. 2 and 3 for respective downlink and uplink modes, for generating the above-mentioned computational models which are referred to as the DNN-DPD module 204 and the DNN-Equalizer module 318.

Use of the term DNN does not necessarily mean that the computational models employ a particular topology or architecture.

Pre-training may be performed in advance of deployment of the particular DU-RU pair, e.g. the DU 100 and the first RU 102, at a factory or in a laboratory.

As will be seen, each of the pre-training setups involve the use of a UE no in wireless signal communication of the first RU 102 for which the particular computational model is to be trained.

Referring to FIG. 7, which shows a pre-training setup for training the DNN-DPD module 204 shown in FIG. 2, relevant functional modules of the UE no are indicated.

For example, the UE no may comprise an antenna 702, an LNA 704, a mixer 706 associated with an LO 708, an ADC 710 and an OFDM decoding module 712. The function and operation of such functional modules is known. In the pre-training setup of FIG. 7, a feedback channel 730 is set-up between the output of the ADC 710 and an input of the DNN-DPD module 204. The feedback channel 730 provides training data to the input of the DNN-DPD module 204.

Referring to FIG. 8, which shows the pre-training setup for training the DNN-Equalizer module 318 shown in FIG. 3, relevant functional modules of the UE no are also indicated. For example, the UE no may comprise an OFDM encoding module 804, a DAC 806, a mixer 808 associated with an LO 810, a power amplifier 812 and the above-mentioned antenna 702. The function and operation of such functional modules is known. In the pre-training setup, a feedback channel 740 is set-up between the input of the OFDM encoding module 804 and an input of the DNN-Equalizer module 318. The feedback channel 740 provides training data to the input of the DNN-Equalizer module 318.

In general overview, the pre-training setups shown in FIGS. 7 and 8 enable pre-training of the DNN-DPD module 204 and the DNN-Equalizer module 318 based on end-to-end non-linearities that may be introduced by virtue of the RF and optical components.

For example, for the downlink mode indicated in FIG. 7, non-linearities may mainly come from the DML 210 and PIN diode 212 and also the power amplifier 218 in the RU 102. Here, device-to-device variation may be small, and hence the pre-trained DNN-DPD 204 may provide a good initial computational model for deployment. For example, for the uplink mode indicated in FIG. 8, non-linearities may mainly come from the DML 308 and PIN diode 310 and also the power amplifier 812 in the UE 110.

As mentioned above, after deployment in the field, refinement training may be performed to cater for field-specific non-linearities.

An overview of pre-training and refinement processes will now be described.

Pre-Training Process

Example pre-training processes for generating the above-mentioned DNN-DPD module 204 and DNN-Equalizer module 318 will now be explained.

In general, the DNN-DPD module 204 and DNN-Equalizer module 318 may be pre-trained using either direct or indirect learning techniques. A direct learning technique may involve approximating the non-linear "channel" and determining its inverse. An indirect learning technique may involve approximating the inverse of the non-linear channel. Both techniques are viable, and an overview of each will be described below.

In the following, the non-linear channel may be denoted by H (e.g. a transfer function) and its learned inverse may be denoted by $H^{-1}$.

Figures 9A, 9B, 9C, 9D:
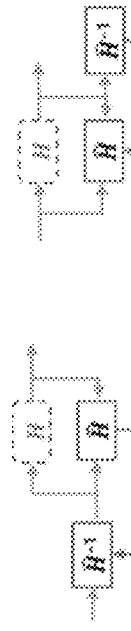
FIGS. 9A-9D are schematic diagrams, including transfer functions, indicative of how pre-training of a computational model may be performed according to some example embodiments.

Referring to FIG. 9A, the learned inverse $H^{-1}$ of the non-linear channel H may represent the end-to-end non-linearities between, for example, the DAC at a transmitting end of the "channel" and the ADC at the receiving end. Hence, between DAC 206 and ADC 710 for the downlink mode and between DAC 806 and ADC 314 for the uplink mode. $H^{-1}$ may represent the trained DNNs 204, 318.

The structure of DNN, whether the DNN-DPD module 204 or the DNN-Equalizer module 318 can vary and there may be trade-offs based on complexity, accuracy and robustness.

FIG. 9B is illustrative of an indirect learning technique for DNN training. In this case, the DNN is configured to learn $H^{-1}$ and may comprise a neural network or similar having an input layer, an output layer, and one or more hidden layers between the input and the output layers. Outputs of the non-linear channel H may be provided as training feature vectors for a DNN input layer, e.g. as feedback data, and the input of the non-linear channel H corresponding to the output may comprise labels of the feature vectors to compute prediction errors at the output layer of the DNN.

Figure 10:
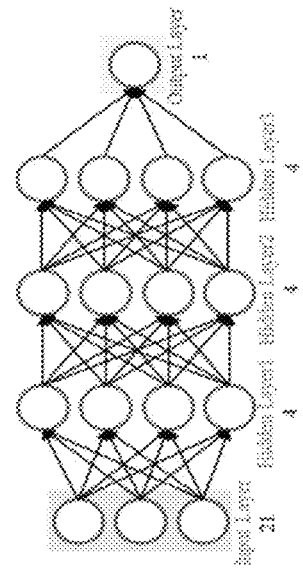
FIG. 10 is a schematic view of a first neural network configuration according to some example embodiments.
Figure 11:
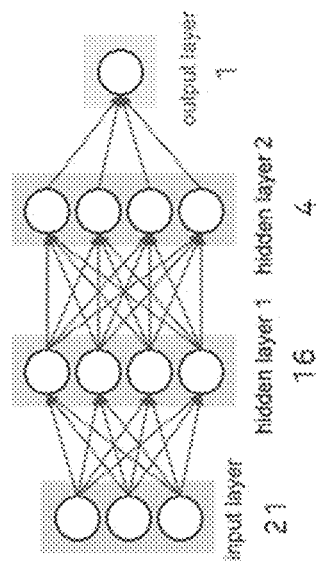
FIG. 11 is a schematic view of a second neural network configuration according to some example embodiments.

FIG. 10 shows an example neural network implementation, which comprises an input layer of 21 nodes, a first hidden layer of 16 nodes, a second hidden layer of 4 nodes and an output layer of 1 node. FIG. 11 shows another example neural network implementation, which comprises an input layer of 21 nodes, first, second and third hidden layers of 4 nodes each, and an output layer of 1 node. Such example neural network implementations can be used both for training the DNN-DPD module 204 and the DNN-Equalizer module 318, using different datasets as indicated by the feedback channels 730, 740 in FIGS. 7 and 8.

FIGS. 9C and 9D are illustrative of a direct learning technique for DNN training. It will be seen that there are two DNN networks, one for learning the non-linear channel H and the other for learning its inverse $H^{-1}$. The two networks, H and $H^{-1}$ may be connected via a batch-to-feature mapping mechanism which converts the output of one network, being a one-dimensional vector (a sequence of continuous output) into a matrix whose number of rows equals the number of nodes of the input layer of the other network.

Figure 12:
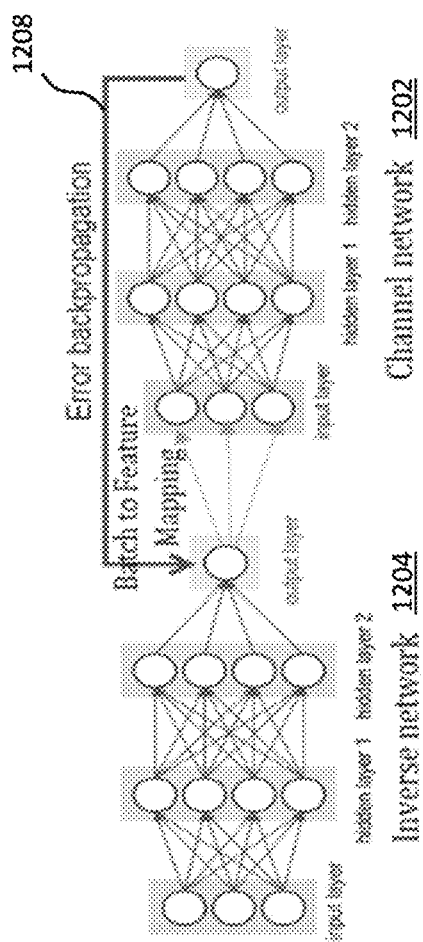
FIG. 12 is a schematic view of a third neural network configuration according to some example embodiments.

For example, referring to FIG. 12, which is an example network for the DNN-DPD module 204, there is a channel network 1202 and an inverse network 1204 whereby the output node of the channel network is fed-back to the output layer of the inverse network. The error between the digitally encoded signal from, for example, the OFDM encoding module 202 at the DU 100 (which serves as a label, or "ground truth" parameter) and the reconstructed digitally encoded signal fed back from the UE 110 (see FIG. 7) may be calculated at the output of the channel network 1202 and then back-propagated to the inverse network 1204 for training, as indicated by the arrow 1208.

Figure 13:
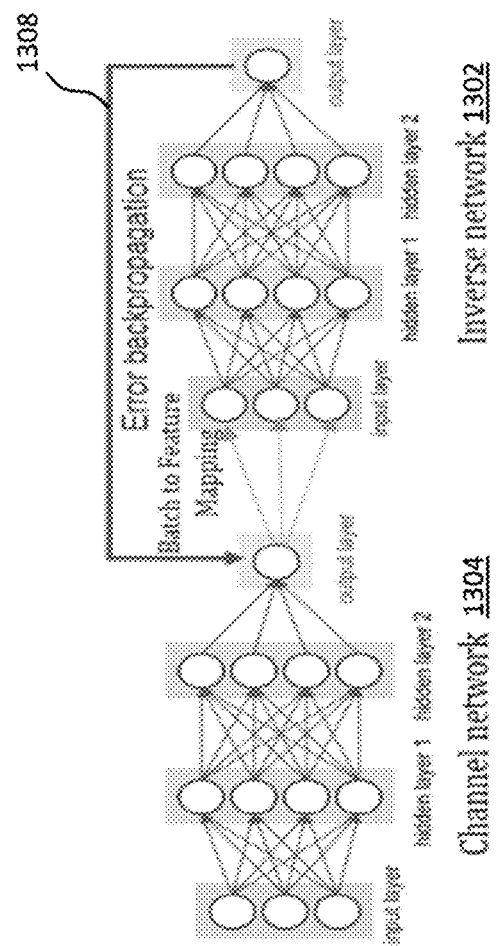
FIG. 13 is a schematic view of a fourth neural network configuration according to some example embodiments.

For example, referring to FIG. 13, which is an example of a DNN network for the DNN-Equalizer module 318, there is a channel network 1304 and an inverse network 1302 whereby the output node of the inverse network is fed-back to the output layer of the channel network. The error between the baseband digitally encoded signal prior to the OFDM encoding module 804 (which serves as a label, or "ground truth" parameter) fed back from the UE 110 (see FIG. 8) and the OFDM decoded digital signal may be calculated at the output of the inverse network 1302 and then back-propagated to the channel network 1304 for training, as indicated by the arrow 1308.

The pre-trained DNN-DPD module 204 and DNN-Equalizer module 318 in the lab can be used as the default modules at the DU 100 to support each DU-RU pair in parallel.

For the DNN-DPD module 204, non-linearities may mainly come from the DML 210 and PIN diode 212 and also the power amplifier 218 in the RU 102. Device to device variation may be small and the need for refinement of the trained model can be accomplished during initial testing stage after deployment. For DUs supporting multiple RUs, a common DNN-DPD module at the DU 100 may be used for all connecting RUs 102, 104 if the power amplifier variation among the RUs is small, as indicated by similarities between DNN network coefficients.

For the DNN-Equalizer module 318, the non-linearities mainly come from the optical transceivers and the PA 812 at the UE 110, where UE to UE variation may be notable. Therefore, for each serving UE, if the SNR of the reconstructed signal is much weaker than expected (inferred from pilot symbols) the DNN-Equalizer module 318 coefficients can be refined in a decision-feedback manner. For example, digital signal at the UE 110 in the UL mode can be reconstructed at the DU 100 after that message being decoded successfully at the DU, thus eliminating the need of explicit feedback from the UE 110.

Refinement Process

The pre-trained DNN-DPD module 204 and DNN-Equalizer module 318 configured according to one of the above pre-training processes may be refined during initial field testing after deployment.

In this context, the pre-trained DNN-DPD module 204 and DNN-Equalizer module 318 may be considered default modules used at the DU 100 for supporting each DU to RU pair in parallel.

Refinement examples will now be summarised with reference to transfer function diagrams in FIGS. 14-19.

Referring to FIG. 14A, the FIG. 7 diagram for the downlink mode may be represented by a first box 1402 representing the pre-trained DNN-DPD module 204 $H_0^{-1}$ and a second box representing the non-linear channel H mentioned above.

Referring to FIG. 14B, the first box 1404 may represent a refined model $H^{-1}$ which may replace the pre-trained DNN-DPD module 204 $H_0^{-1}$ once re-trained.

This refinement may be performed based on further feedback from the UE 110 or another UE.

In accordance with an indirect learning technique for refinement of the DNN-DPD module 204, reference is made to FIG. 15.

Example refinement operations may comprise:
(1) receive encoded digital signals from the output of the pre-trained DNN-DPD module 204 and the corresponding feedback digital signals (digital signals from the UE 110) which are indicated by the dashed arrows leading to a dashed box 1404 $H^{-1}$ representing the refined DNN-DPD 204; and
(2) obtain the refined computational model 204 $H^{-1}$ based on the two signals using the same DNN structure as used for the pre-trained DNN-DPD module 204 as above.

In accordance with a direct learning technique for refinement of the DNN-DPD module 204, reference is made to FIGS. 16A and 16B.

Example refinement operations may comprise:
(1) receive encoded digital signals from the output of the pre-trained DNN-DPD module 204 and the corresponding feedback digital signals (digital signals from the UE 110) which are indicated by the dashed arrows leading to a dashed box 1406 $H^\wedge$;
(2) obtain a refined model of the non-linearity channel H (inside the dashed box 1406 H) based on the two signals using the same DNN structure as used in the pre-training process;
(3) obtain encoded digital data, feeding it to the refinement module 1408, whose output is then sent to the refined channel module 1406, whose output is then sent to the refinement module 1408; and
(4) obtain the refined model 1408 $H^{-1}$ using the same DNN structure as the pre-trained DNN-DPD module 204.

Referring to FIG. 17A, the FIG. 8 diagram for the uplink mode may be represented by a first box 1702 representing the pre-trained DNN-Equalizer module 318 $H_0^{-1}$ and a second box 1703 representing the non-linear channel H mentioned above.

Referring to FIG. 17B, the first box 1704 may represent a refined model $H^{-1}$ which may replace the pre-trained DNN-Equalizer module 318 $H_0^{-1}$ once re-trained.

A refined model for $H^{-1}$ can be generated on a per-UE basis, for example based on UL pilot symbols or control sequences, and will replace the pre-trained DNN-Equalizer module 318. No explicit feedback from a UE is required.

In accordance with an indirect learning technique for refinement of the DNN-Equalizer module 318, reference is made to FIG. 18.

Example refinement operations may comprise:
(1) obtain OFDM decoded digital signals (indicated y in FIG. 18) of uplink pilot symbols or control sequences (indicated x in the diagram), which are known to the DU 100, from the output of the OFDM decoding module 316;
(2) reconstruct digital data (x~) of the uplink pilot symbols or control sequences based on output data (x^) of the pre-trained linearization module; and
(3) obtain the refined computational model $H^{-1}$ based on the two sets of data (y and x~) using the same DNN structure as for the DNN-Equalizer module 318.

In accordance with a direct learning technique for refinement of the DNN-Equalizer module 318, reference is made to FIGS. 19A and 19B.

Example refinement operations may comprise:
(1) obtain OFDM decoded digital data of UL pilot symbols or control sequences, which are known to the DU 100, from the output of the OFDM decoding module 316;

(2) reconstruct a digital data of the uplink pilot symbols or control sequences based on the output data of the pre-trained linearization module;
(3) obtain a refined model of the non-linear channel H based on the two sets of data using the same DNN structure as used in the pre-training process;
(4) provide the reconstructed digital data x~ to the refined channel module, whose output is sent to the refinement module, whose output is then sent back to the refined channel module; and
(5) obtain the refined computation model $H^{-1}$ using the same DNN structure as for the pre-trained model.

Reconstruct the digital data x~ of the uplink pilots or control sequences based on the output data x^ from the DNN-Equalizer module 318 can be done, for example, by first demodulating and error-correction decoding x^ to a bit sequence, and then performing corresponding error-correction encoding and modulation on the decoded bit sequence to construct the modulated sequence x~. When the error-correction decoding of x^ is successful, e.g. matching to known sequences defined by a standard, the reconstructed x~ will be identical to the UE transmitted data x. There are many different ways for performing this reconstruction, as will be known and appreciated. For example, the error-correction decoding and encoding process may be avoided and received symbols (with noise) may be directly mapped to modulated symbols (without noise) if the SNR is high.

Operation of the Computational Models

In some example embodiments, the trained computational models $H^{-1}$, whether the DNN-DPD module 204 or the DNN-Equalizer module 318, may be used as a multiple-input single-output (MISO) digital filter whose structure and coefficients are obtained through the pre-training and/or refinement processes described above.

For a trained model with N input nodes and 1 output node (N=21 in embodiment mentioned above), a stream of digital data of length K may be input to the DNN network, generating K output data (representing predistorted data for the DNN-DPD module 204, or equalized/linearized data for the DNN-Equalizer module 318). The K sequence may be first rearranged to generate N parallel sequences, each of length K, before feeding to the N-input DNN network for filtering.

In some example embodiments, the rearrangement of a K length sequence to an N-by-K matrix (i.e., N parallel sequences, each of length K) can be performed in many different ways, as long as the same approach is applied for both the training of the computational model and the using of the computational model for data processing.

For example, one can fill the data number 1-to-N from the length K-length data stream as the first data of each of the N inputs, and the data number 2-to-(N+1) from the stream as the second data of each of the N inputs, and so on. Incomplete columns may be appended with zeros.

For example, one can first append M zeros (e.g., o<M<N/2) at the beginning of the K-length data stream, and then fill the data number 1-to-N from the (M+K)—length data stream as the first data of each of the N inputs, and the data number 2-to-(N+1) from the stream as the second data of each of the N inputs, and so on. Incomplete columns may be appended with zeros.

Testing and Simulation

In testing of a DU 100 of the type shown in FIGS. 1-3, it was seen that transmitted analogue signals (at IF) suffered from three main types of distortions, namely non-linearities, intersymbol interference (ISI) caused by hardware imperfections, and wireless multipath. These are respectively indicated by graphs in FIGS. 20A-C. In quantifying the potential impacts of these distortions, the end-to-end link was simulated by adding each distortion type in turn. Non-linearity was emulated by a sigmoid function and wireless multipath by a two-tap delay of 40 ns and power difference of 5 dB (representing two dominant paths). The reconstructed 16-QAM constellations are indicated in FIG. 21A-D with respective error vector magnitudes (EVMs) indicated. The first constellation in FIG. 21A comprises only additive white Gaussian noise (AWGN) whereas the other added distortions are indicated alongside each of three other constellations in FIGS. 21B-D. It can be seen that the ISI from hardware imperfections and wireless multipath can be mitigated by use of the OFDM cyclic prefix and associated linear equalizations present in standards such as 4G and 5G NR. The dominating distortion, however, is the non-linearity which example embodiments herein are configured to mitigate by use of the DNN-DPD module 204 or the DNN-Equalizer module 318.

Figures 22A, 22B, 22C, 22D:
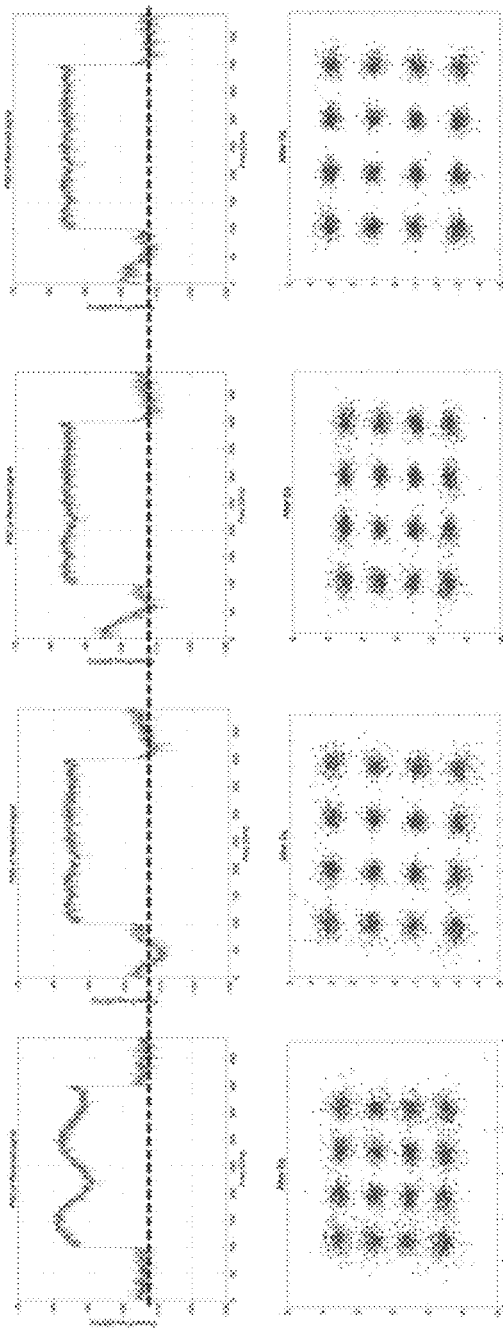
FIGS. 22A-22D are graphical representations of simulated performance when not using and when using example embodiments.

Simulations were performed involving use of the DNN-DPD module 204 according to example embodiments. The non-linearities of the optical components and optical fibre dispersion were emulated using software. FIGS. 22A-D indicate SNR and EVM measurements for approaches involving no DPD (FIG. 22A) and involving Volterra-based DPD (FIG. 22B) as well as indirect and direct learning DNN-DPD approaches as described herein (FIGS. 22C and 22D). It is seen that the indirect learning DNN-DPD approach showed a 2.43 dB SNR gain over the use of no DPD, and EVM of 13.48%, and the direct learning DNN-DPD approach showed a 3.84 dB gain over the use of no DPD, and EVM of 11.45%, after two iterations.

These simulations therefore indicate the feasibility of mitigating non-linearities without requiring DPD functionality at the RU and hence may justify the shifting of DFE functionality, including DPD functionality, to the DU which offers the ability to provide less complex RUs.

Figure 23:
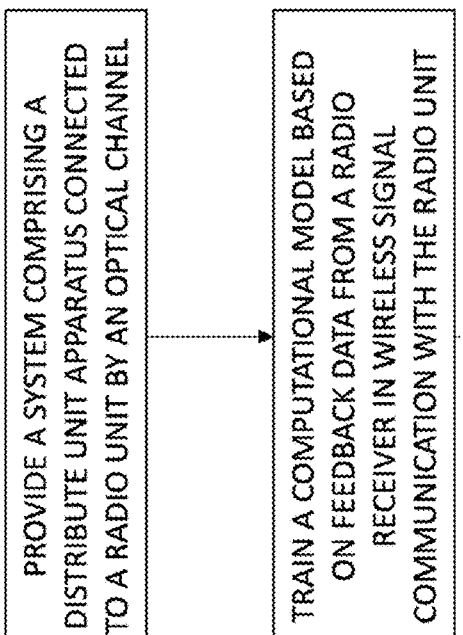
FIG. 23 is a flow diagram indicating processing operations that may be performed by an apparatus according some embodiments in training a computational model.

FIG. 23 is a flow diagram indicating processing operations that may be performed by the DU 100 in performance of training the DNN-DPD and/or DPD-Equalizer modules 204, 318 according to example embodiments. The processing operations may be performed using hardware, firmware, software or a combination thereof.

A first operation 23.1 may comprise providing a system comprising a DU apparatus connected to a RU by an optical channel.

A second operation 23.2 may comprise training a computational model based on feedback data from a radio receiver in wireless signal communication with the RU.

A third operation 23.3, which is optional, may comprise performance of refinement training.

Example Apparatus

Figure 24:
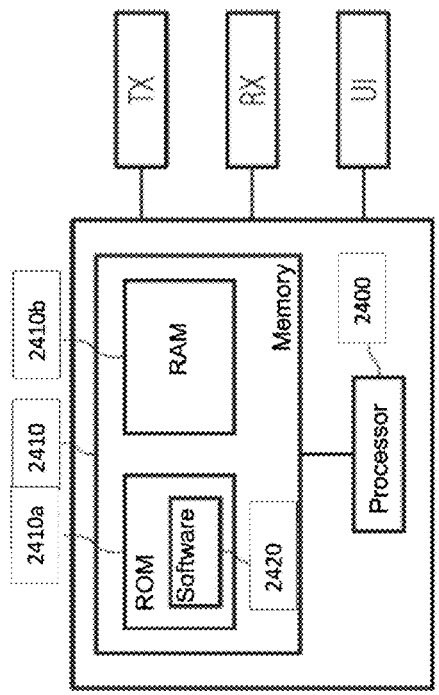
FIG. 24 is a schematic view of an apparatus that may be configured according to some example embodiments.

FIG. 24 shows an example apparatus that may comprise, for example, one or more components of the DU 100 or the first or second RU 102, 104.

The apparatus may comprise at least one processor 2400 and at least one memory 2410 directly or closely connected or coupled to the processor. The memory 2410 may comprise at least one random access memory (RAM) 2410b and at least one read-only memory (ROM) 2410a. Computer program code (software) 2420 may be stored in the ROM 2410a. The apparatus may be connected to a transmitter path and a receiver path in order to obtain respective signals or data. The apparatus may be connected with a user interface (UI) for instructing the apparatus and/or for outputting data. The at least one processor 2400 with the at least one memory 2410 and the computer program code 2420 may be arranged to cause the apparatus to at least perform methods described herein.

The processor 2400 may be a microprocessor, plural microprocessors, a microcontroller, or plural microcontrollers.

The memory may take any suitable form.

Figure 25:
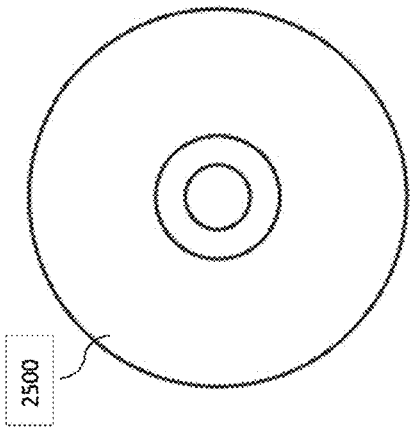
FIG. 25 is a non-transitory medium which may carry computer-readable code and/or a work product according to some example embodiments.

FIG. 25 shows a non-transitory media 2500 according to some embodiments. The non-transitory media 2500 is a computer readable storage medium. It may be e.g. a CD, a DVD, a USB stick, a blue ray disk, etc. The non-transitory media 2500 may store computer program code causing an apparatus to perform operations described above when executed by a processor such as processor 2400 of FIG. 24. The non-transitory media 2500 may also store a work-product generated by means of performing the operations described above with reference to FIG. 23.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus, comprising:
at least one processor; and
at least one memory including computer program code, the at least one memory and computer program code being configured, with the at least one processor, to cause the apparatus to perform:
providing a digital signal;
performing, based on a pre-trained computational model, a predistortion operation on the digital signal to produce a predistorted digital signal;
converting the predistorted digital signal to an analogue signal;
modulating an optical signal based on the analogue signal;
transmitting, the optical signal via an optical channel connected to a remote radio unit for demodulation by an optical demodulator of the remote radio unit for transmission via one or more antennas of the remote radio unit;
wherein the computational model is pre-trained based on feedback data from a radio receiver in wireless signal communication with the remote radio unit, the feedback data indicative of one or more non-linearities introduced by the modulating, the optical channel, the optical demodulator of the remote radio and by one or more amplifiers of the remote radio unit and the radio receiver.

2. The apparatus of claim 1, wherein the feedback data comprises digital versions of signals received by the radio receiver corresponding to digital signals provided by the apparatus, wherein the computational model is pre-trained based on the received and provided digitally encoded signals.

3. The apparatus of claim 1, wherein performing the predistortion operation comprises using the pre-trained computational model which is configured to receive the provided digital signal as input and to output the predistorted digital signal based on learned coefficients of the pre-trained computational model.

4. The apparatus of claim 1, wherein the digital signal represents a baseband signal, and wherein the modulating comprises up-converting the baseband signal to an intermediate frequency (IF).

5. The apparatus of claim 1, wherein a plurality of digital signals are provided for transmission by a plurality of respective radio units connected to the apparatus by respective optical channels.

6. The apparatus of claim 5, wherein performing the predistortion operation comprises:
using a first version of the computational model for performing a predistortion operation on a first digital signal for transmission by a first radio unit, and
using a second version of the computational model for performing a predistortion operation on a second digital signal for transmission by a second radio unit, and wherein
at least one of the first and second versions being a modified version of the pre-trained computational model based on receiving further feedback data.

7. The apparatus of claim 1, wherein a plurality of digital signals are provided, each digital signal representing a respective beam to be transmitted by a respective plurality of antenna elements of a radio unit, and wherein the at least one memory and computer program code are further configured, with the at least one processor, to cause the apparatus to:
convert the plurality of digital signals to respective analogue signals;
modulate and transmit to the radio unit an optical signal over the optical channel based on the respective analogue signals at different intermediate frequencies; and
transmit to the radio unit one or more control signals over the optical channel indicative of which of the one or more analogue signals to transmit using a particular beam at a particular time.

8. A system, comprising:
the apparatus according to claim 1, wherein the apparatus comprises a distribute unit apparatus of a radio access network; and
one or more radio units connected to the distribute unit apparatus by one or more respective optical channels.

9. An apparatus, comprising:
at least one processor; and
at least one memory including computer program code, the at least one memory and computer program code being configured, with the at least one processor, to cause the apparatus to perform:
receiving an optical signal received from a radio unit over an optical channel;
demodulating the optical signal to provide an analogue signal;
converting the analogue signal to a digital signal; and
performing, based on one or more pre-trained computational models, an equalization operation on a digital signal or a digitally decoded version thereof corresponding to the optical signal to produce an equalized digital signal;
wherein the computational model is pre-trained based on feedback data from a radio transmitter in wireless signal communication with the radio unit, the feedback data being indicative of one or more non-linearities introduced at least by optical signal modulating of the radio unit, the optical channel, and the demodulating of the apparatus and by one or more amplifiers of the radio unit and the radio receiver.

10. The apparatus of claim 9, wherein the at least one memory and computer program code are further configured, with the at least one processor, to cause the apparatus to perform an OFDM decoding operation to provide an OFDM decoded version of the digital signal and wherein the equalization operation is performed on the OFDM decoded version of the digital signal.

11. The apparatus of claim 9, wherein the feedback data comprises digital signals transmitted by the radio transmitter corresponding to digital signals received and converted by the apparatus, wherein the computational model is pre-trained based on the transmitted and received digital signals.

12. The apparatus of claim 9, wherein the at least one memory and computer program code are further configured, with the at least one processor, to cause the apparatus to
receive an optical signal representing a plurality of beams from respective plurality of antenna elements of a radio unit;
filter the analogue signal corresponding to the demodulated optical signal to recover a plurality of analogue signals corresponding to the plurality of beams;
convert the plurality of analogue signals into respective digital signals; and
perform the linearizing operation on the respective digital signals.

* * * * *